United States Patent Office 2,830,048
Patented Apr. 8, 1958

2,830,048

α,β (DISUBSTITUTED AMINOALKYL) ACETYLENES

John H. Biel, Milwaukee, Wis., assignor to Lakeside Laboratories, Inc., a corporation of Wisconsin No Drawing. Application November 10, 1954
Serial No. 468,137

20 Claims. (Cl. 260—247.5)

This invention relates to alkynes. Particularly, this invention is concerned with novel $a,\beta$-(N-disubstituted aminoalkyl)-acetylenes of the formula

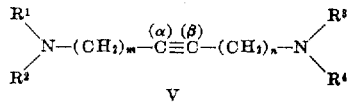

and salts thereof wherein m and n are the same or different integers, but not zero the sum of which is at least 3, $R^1$, $R^2$, $R^3$ and $R^4$ are the same or different alkyl, alkenyl, aryl, aralkyl, cycloalkyl, cycloalkenyl, heterocyclic groups and groups wherein $R^1$ and $R^2$, and $R^3$ and $R^4$, are joined so that the nitrogen is part of a heterocyclic group. This invention is also concerned with novel processes of producing these compounds.

The $a,\beta$-(N-disubstituted aminoalkyl)-acetylenes represented by the formula above may be conveniently produced by the novel process which comprises reacting an appropriate secondary amine (I) with an appropriate monohalo-1-alkyne (II) to produce the corresponding disubstituted amino-1-alkyne (III) and reacting said compound with an appropriate tertiary aminoalkyl halide (IV) to produce the corresponding $a,\beta$-(N-disubstituted aminoalkyl)-acetylene (V). This process may be represented as follows

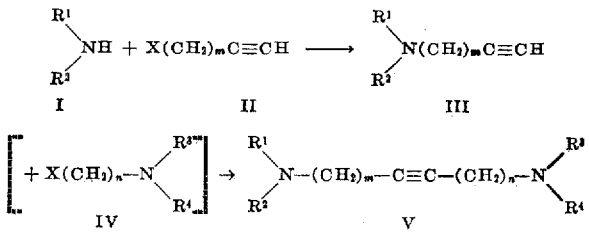

wherein m, n, $R^1$, $R^2$, $R^3$ and $R^4$ have the significance previously assigned and X is a reactive halogen.

In the first step of this process the secondary amine and monohalo-1-alkyne are conveniently reacted by contacting said compounds, preferably in about equal molar quantities, in the presence of a suitable inert organic solvent such as an alkyl ether like ethyl ether or isopropyl ether, inert chlorinated hydrocarbons such as chloroform, alkanes such as pentane and hexane, or solvents such as toluene and triethylamine. Elevated temperatures such as the reflux temperature are suitable for effecting the reaction. Reaction is completed in a matter of hours, ordinarily about 2 to 12 hours being adequate. Following completion of the reaction the desired disubstituted amino-1-alkyne is present as the corresponding hydrohalide salt. The salt may be recovered from the reaction mixture by procedures such as evaporation of the solvent or extraction with an immiscible polar solvent. However, by treating the salt with an alkaline material the free amine is obtained.

Any suitable secondary amine may be employed in the described reaction and such amines may be symmetrical or unsymmetrical. Some such amines which might be mentioned are dimethylamine, diethylamine, dipropylamine, diallylamine, methylethylamine, dibenzylamine, diphenylamine, pyrrolidine, morpholine, piperidine and methylaniline.

Monohalo-1-alkynes having alkyne chains of at least three carbons such as the propyne, butyne, pentyne, hexyne and higher alkynes may be used in the reaction. Alkynes with halo substituents such as the chloro, bromo and iodo are particularly suitable for use in the reaction; the fluoro compounds are not ordinarily used as such compounds are far less reactive.

By employing the reactants and conditions described above, disubstituted amino-1-alkynes of the formula set forth above may be conveniently produced. Among the compounds which may be so produced are 3-dimethylamino-1-propyne, 3-dimethylamino-1-propyne, 3-dipropylamino-1-propyne, 3-diphenylamino-1-propyne, 4-dimethylamino-1-butyne, 5-dibenzylamino-1-pentyne, 3-(N-pyrrolidinyl)-1-propyne, 3-(N-morpholinyl) - 1 - propyne, 3-methylaniline-1-propyne, 3-(N-piperidyl)-1-propyne and hydrohalide salts thereof. Quaternary salts are produced by treating the free amines with alkyl or alalkyl halides such as methyl chloride and benzylbromide.

In the second step of this process a disubstituted amino-1-alkyne is reacted in the form of a metal salt with a suitable tertiary aminoalkyl halide to produce the desired $a,\beta$-(N-disubstituted aminoalkyl)-acetylene.

Salts of the disubstituted amino-1-alkynes may be produced prior to effecting the subject reaction or they may be conveniently produced in situ in the course of reaction. Alkali metal salts such as the lithium, sodium and potassium are suitable for use in this reaction and are readily formed by contacting the alkyne with a suitably reactive alkali metal compound such as an alkali metal amine or hydride. Examples of tertiary aminoalkyl halides which are suitable reactants are those in which the alkylene group is at least two carbon atoms and above, such as ethylene, propylene, butylene, pentamethylene and hexamethylene, the halogen is bromine, chlorine or iodine and the tertiary amino groups are such as those previously mentioned above.

To effect this reaction, an alkyne in the form of a salt, or the alkyne together with a suitable salt producing compound, is contacted with the tertiary aminoalkyl halide in the presence of an inert organic solvent. Elevated temperatures, including the reflux temperature, are used to induce reaction. Reaction times of one hour are often adequate, but longer periods are sometimes required with certain of the reactants. Following completion of the reaction, the desired compound may be isolated directly as a hydrohalide salt. By neutralizing the mixture the free base is obtained and isolated by techniques used in the art. If desired, the $a,\beta$-(N-disubstituted aminoalkyl)-acetylene may be isolated directly as a hydrohalide salt.

Representative $a,\beta$ - (N - disubstituted aminoalkyl)-acetylenes produced according to this reaction by selection of the appropriate reactants are 1,5-bis(N-dimethylamino)-2-pentyne, 1,5 - bis(N-diethylamino)-2-pentyne, 1,6 - bis(N - dimethylamino) - 3 - hexyne, 1 - (N-methylamino) - 6 - (N - diethylamino) - 3 - hexyne, 1,6-bis(N-pyrrolidino) - 2 - hexyne, 1,6 - bis(N - morpholino)-2-hexyne, 1,6-bis(N-piperidino)-2-hexyne and similar compounds in which the alkyne group is larger, such as heptyne, octyne, decyne and the like.

Acid addition salts of these and other such compounds included within the scope of this invention are produced by contacting the alkyne with a suitable acid such as a mineral acid like sulfuric acid or hydrochloric acid or organic acids like formic acid, citric acid, and so on. Up to two moles of acid may add to a mole of alkyne.

Quaternary ammonium salts are readily produced by contacting the alkyne with alkyl and aralkyl esters of mineral and organic acids, preferably in the presence of an aqueous organic solvent. Examples of compounds which may be reacted with an alkyne to form quaternary ammonium salts thereof are the alkyl halides such as methyl chloride, ethyl bromide and the like, methyl sulfate, and so on.

The compounds of this invention as the free base are generally liquids and possess interesting solvent properties. These compounds are also readily reduced to the corresponding ethylene (olefin) derivatives and as such are polymerized into useful plastic materials. Hydrolysis of these compounds gives the corresponding ketones which are conveniently reduced such as with sodium borohydride to give the alcohols; such alcohols are interesting solvents. As may be seen in my copending application Serial No. 473,033, filed December 3, 1954, I have found that such compounds in dosage unit form are useful for lowering blood pressure.

The following examples are presented to show methods of producing certain of the novel compounds included within this invention. It is understood, however, that these examples are included only for purposes of illustration, and that the invention is not to be restricted to the embodiments specifically disclosed therein.

EXAMPLE 1

*3-pyrrolidinyl-1-propyne*

To 46.0 gm. of pyrrolidine in 100 ml. of anhydrous ethyl ether was added 35.0 gm. of propargyl bromide with stirring. The mixture was stirred at reflux for 12 hours. The ether layer was decanted from the oily pyrrolidine hydrobromide which was then extracted three times with ether. The combined ether extracts were dried with potassium carbonate to give 3-pyrrolidinyl-1-propyne which was collected by distillation at 74–77° C. (85 mm.).

EXAMPLE 2

*3-diethylamino-1-propyne*

Diethylamine and propargyl bromide were reacted as in Example 1, but in di-isopropyl ether to give 3-diethylamino-1-propyne; B. P. 60–62° C. (85 mm.).

EXAMPLE 3

*3-morpholinyl-1-propyne*

To 174 gm. of morpholine in 400 ml. of anhydrous ethyl ether was added, with stirring, 119 gm. of propargyl bromide. The mixture was refluxed with stirring for 16 hours. A precipitate of morpholine hydrobromide was separated by filtration. By distilling the ethereal solution, 3-morpholinyl-1-propyne was recovered; B. P. 64° C. (10 mm.).

EXAMPLE 4

*3-(N-piperidino)-1-propyne*

Piperidine and propargyl bromide were reacted in di-isopropyl ether as described in Examples 1 and 2 and the product collected at 55–57° C. (12 mm.).

EXAMPLE 5

*3-diisopropylamino-1-propyne*

Diisopropylamine and propargyl bromide were reacted as in Example 4 and the desired product isolated; B. P. 55–58° C. (25 mm.).

EXAMPLE 6

*1,6-bis(N-dimethylamino)-2-hexyne*

To 39 gm. of sodium amide in 100 ml. of toluene was added with stirring 83 gm. of 3-dimethylamino-1-propyne. After the vigorous evolution of ammonia had ceased, the reaction mixture was gradually heated to reflux temperature and held there for one hour. To the hot mixture containing the sodium salt of 3-dimethylamino-1-propyne was added 122 gm. of 3-dimethylamino-1-chloropropane. The reaction mixture was stirred and refluxed for twenty hours. The mixture was cooled and 100 ml. of water added. The water layer was separated and the organic layer extracted three times with dilute, aqueous hydrochloric acid. The aqueous acid extracts were combined with original water layer and washed several times with ethyl ether. The ether washings were discarded and the aqueous acid layer containing 1,6-bis(N-dimethylamino)-2-hexyne dihydrochloride was treated with solid potassium hydroxide until a definite second layer of the amine appeared. The alkaline mixture was extracted repeatedly with ether and the ether extracts dried with potassium carbonate. The ethereal extracts were clarified by filtration and fractionally distilled to give 1,6-bis(N-dimethylamino)-2-hexyne; B. P. 60–61° C. (1.0 mm.).

EXAMPLE 7

*1,6-bis(N-dimethylamino)-2-hexyne dimethylbromide*

To 8.0 gm. of 1,6-bis(N-dimethylamino)-2-hexyne in 50 ml. of isopropyl alcohol was added 9.5 gm. of methylbromide. A white precipitate of 1,6-bis(N-dimethylamino)-2-hexyne dimethylbromide formed and was separated by filtration; M. P. 229–230° C.

EXAMPLE 8

*1,6-bis(N-dimethylamino)-2-hexyne dihydrochloride*

By reacting 1,6-bis(N-dimethylamino)-2-hexyne with sufficient hydrochloric acid there was obtained the dihydrochloride salt thereof; M. P. 152–154° C.

EXAMPLE 9

*1,6-bis-(N-diisopropylamino)-2-hexyne*

The product was prepared by the method described for Example 6; B. P. 108–110° C. (0.20 mm.).

EXAMPLE 10

*1,6-bis(N-pyrrolidino)-2-hexyne*

To 31.2 gm. of sodium amide in 100 ml. of toluene was added, with stirring, 87 gm. of 3-(N-pyrrolidino)-1-propyne. The mixture was heated gradually to reflux temperature and stirred at reflux for one hour. To the hot mixture containing the sodium salt of 3-(N-pyrrolidino-1-propyne was added 116.6 gm. of 3-(N-pyrrolidino)-1-chloropropane. The mixture was allowed to stir at reflux for 18 hours. 1,6-bis(N-pyrrolidino)-2-hexyne was recovered as in Example 6; B. P. 150° C. (3 mm.).

EXAMPLE 11

*1,6-bis(N-pyrrolidino)-2-hexyne dimethyliodide*

The base produced as in Example 10 was reacted with sufficient methyliodide in the presence of isopropyl alcohol to produce 1,6-bis(N-pyrrolidino)-2-hexyne dimethyliodide; M. P. 132–134° C.

The dimethylbromide was produced in a similar manner; M. P. 120–122° C.

EXAMPLE 12

*1,6-bis(N-diethylamino)-2-hexyne*

To 18.5 gm. of sodium amide in 50 ml. of toluene was added, with stirring, 55.5 gm. of 3-diethylamino-1-propyne. The mixture was slowly heated to reflux and held at reflux for one hour. To the refluxing mixture was added 76.8 gm. of 3-diethylamino-1-chloropropane. Refluxing with stirring was continued for 20 hours. The reaction mixture was cooled to room temperature and 150 ml. of water was added to dissolve the solid. The aqueous layer was separated and the organic layer extracted three times with 150 ml. aliquots of dilute aqueous hydrochloric acid. The acid extracts were combined with the aqueous layer and washed with ether. The aqueous layer containing 1,6-bis(N-diethylamino)-2-hexyne dihydrochloride was saturated with solid potassium hydroxide. The alkaline mixture was extracted with ether and the ether extracts dried with potassium carbonate. The mixture was distilled to give 1,6-bis(N-diethylamino)-2-hexyne; B. P. 95–98° C. (0.50 mm.).

EXAMPLE 13

*1,6-bis(N-diethylamino)-2-hexyne dimethylbromide*

1,6-bis(N-diethylamino)-2-hexyne and methylbromide were reacted as in Example 7 to give 1,6-bis(N-diethylamino)-2-hexyne dimethylbromide; M. P. 225–228° C.

EXAMPLE 14

*1,6-bis(N-diethylamino)-2-hexyne dihydrochloride*

1,6-bis(N-diethylamino)-2-hexyne in isopropyl alcohol was contacted with ethereal hydrochloric acid to form 1,6-bis(N-diethylamino)-2-hexyne dihydrochloride; M. P. 245–246° C.

EXAMPLE 15

*1,6-bis(N-morpholinyl)-2-hexyne*

Equal molar amounts of the sodium salt of 3-(N-morpholinyl)-1-propyne and 3-(N-morpholinyl)-1-chloropropane were reacted as in Example 10 to produce 1,6-bis(N-morpholinyl)-2-hexyne; B. P. 163° C. (1.3 mm.).

EXAMPLE 16

*1,6-bis(N-morpholinyl)-2-hexyne dihydrochloride*

An ethereal hydrochloric acid solution was contacted with an acetone solution of 1,6-bis(N-morpholinyl)-2-hexyne to produce the dihydrochloride salt thereof; M. P. 213–215° C.

EXAMPLE 17

*1,6-bis(N-morpholinyl)-2-hexyne dimethylbromide*

The base and methylbromide were reacted as in Example 7 to produce the desired compound; M. P. 185–187° C.

EXAMPLE 18

*1,6-bis(N-piperidyl)-2-hexyne*

To 11.6 gm. of sodium amide in 30 ml. of triethylamine was added 38 gm. of 3-(N-piperidino)-1-propyne and the mixture refluxed with stirring for one hour. To the refluxing mixture was added 48 gm. of 3-(N-piperidino) propyl chloride. The resulting mixture was stirred and refluxed for 20 hours. A precipitate was removed by filtration and the filtrate fractionally distilled to give the desired product; B. P. 160–162° C. (1.1 mm.).

EXAMPLE 19

*1,6-bis-(N-piperidyl)-2-hexyne dihydrochloride*

The base of Example 18 and ethereal hydrochloric acid were mixed in isopropyl alcohol and the desired product obtained; M. P. 240–241° C.

EXAMPLE 20

*1,6-bis-(N-piperidyl)-2-hexyne dimethobromide*

The base of Example 18 and methyl bromide were reacted as in Example 7 to produce the desired compound; M. P. 248–250° C.

EXAMPLE 21

*1,5-bis-(N-pyrrolidinyl)-2-pentyne*

To 11.7 gm. of sodium amide in 75 ml. of toluene was added 32.7 gm. of 3-pyrrolidino-1-propyne and the mixture refluxed for one hour. To the refluxing mixture was added 36.0 gm. of 2-(N-pyrrolidyl)-ethyl chloride and the reaction mixture stirred and refluxed for 20 hours. To the cooled mixture was then added 100 ml. of water. The water layer was separated and the toluene layer extracted with dilute aqueous hydrochloric acid. The acid solution was then made strongly alkaline with solid potassium hydroxide to the appearance of two definite layers. The alkaline solution was extracted with ether, the ether layer dried with potassium carbonate and 1,5-bis-(N-pyrrolidinyl)-2-pentyne collected by distillation at 95–98° C. (0.30 mm.).

EXAMPLE 22

*1,5-bis(N-pyrrolidyl)-2-pentyne dimethobromide*

The base of Example 15 and methylbromide were reacted as in Example 7 to produce the desired compound; M. P. 230–231° C.

EXAMPLE 23

*1,5-bis-(N-pyrrolidyl)-2-pentyne dihydrochloride*

The base of Example 15 and ethereal hydrochloric acid were mixed in acetone and the desired product obtained; M. P. 284–286° C.

EXAMPLE 24

*1,5-bis-(N-diethylamino)-2-pentyne*

This compound was obtained by reacting 3-dimethylamino-1-propyne and 2-dimethylamino-1-chloroethane as described in Example 21; B. P. 85–90° C. (1.5 mm.).

Various changes and modifications of the invention can be made and, to the extent that such variations incorporate the spirit of this invention, they are intended to be included within the scope of the appended claims.

What is claimed is:

1. A member of the group consisting of a 1,5-(N-di-lower alkyl amino)-2-pentyne, a 1,6-(N-di-lower alkyl amino)-2-hexyne, 1,6-(N-di-lower alkylamino)-3-hexyne, and compounds of the formula

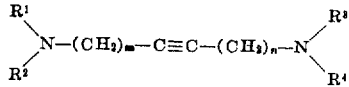

wherein $m$ and $n$ are integers, but not zero, having a sum of at least 3 but not greater than 8; $R^1$ and $R^2$ are members of the group consisting of the same and different lower alkyl, phenyl and phenyl-lower alkyl groups and groups wherein $R^1$ and $R^2$ are joined so that the nitrogen is part of a monocyclic heterocyclic group of the group consisting of piperidino, pyrrolidino and morpholino groups, and $R^3$ and $R^4$ are members of the group consisting of the same and different phenyl and phenyl-lower alkyl groups and groups wherein $R^3$ and $R^4$ are joined so that the nitrogen is part of a monocyclic heterocyclic group of the group consisting of piperidino, pyrrolidino and morpholino groups, and acid addition salts and quaternary ammonium salts thereof.

2. 1,6-bis(N-di-lower alkyl amino)-3-hexynes.
3. 1,6(N-di-lower alkyl amino)-2-hexynes.
4. 1,6-bis(N-dimethylamino)-2-hexyne.
5. 1,6-bis(6-dimethylamino)-2-hexyne dimethylbromide.
6. 1,6-bis(N-dimethylamino)-2-hexyne dihydrochloride.
7. 1,6-bis(N-pyrrolidinyl)-2-hexyne.
8. 1,6-bis(N-pyrrolidinyl)-2-hexyne dimethyliodide.
9. 1,6-bis(N-diethylamino)-2-hexyne.
10. 1,6 - bis(N - diethylamino) - 2 - hexyne dimethylbromide.
11. 1,6-bis(N-diethylamino)-2-hexyne dihydrochloride.
12. 1,6-bis(N-morpholinyl)-2-hexyne.
13. 1,6-bis(N-morpholinyl)-2-hexyne dihydrochloride.
14. 1,6-bis(N-morpholinyl)-2-hexyne dimethylbromide.
15. The process which comprises reacting a compound of the formula

with a compound of the formula

to produce a compound of the formula

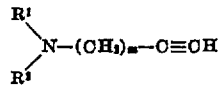

and reacting said compound in the form of an alkali metal salt with a compound of the formula

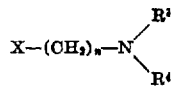

to produce a compound of the formula

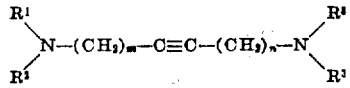

wherein in each occurence X is a member of the group consisting of chlorine, bromine and iodine, $m$ and $n$ are intergers, but not zero, having a sum of at least 3 but not greater than 8; $R^1$, $R^2$, $R^3$ and $R^4$ represent members of the group consisting of the same and different lower alkyl, phenyl, phenyl-lower alkyl, and groups wherein $R^1$ and $R^2$, and $R^3$ and $R^4$, are joined so that the nitrogen is part of a monocyclic heterocyclic group of the group consisting of piperidino, pyrrolidino and morpholino groups.

16. The process which comprises reacting a compound of the formula

with a compound of the formula

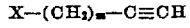

to product a compound of the formula

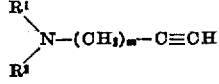

wherein $m$ is an integer above zero but not greater than 7, X is a member of the group consisting of chlorine, bromine and iodine, and $R^1$, $R^2$, $R^3$ and $R^4$ represent members of the group consisting of the same and different lower alkyl, phenyl, phenyl-lower alkyl, and groups wherein R' and $R^2$, and $R^3$ and $R^4$, are joined so that the nitrogen is part of a monocyclic heterocyclic group of the group consisting of piperidino, pyrrolidino and morpholino groups.

17. The process which comprises reacting a compound of the formula

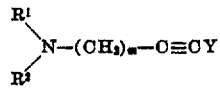

with a compound of the formula

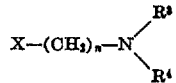

to produce a compound of the formula

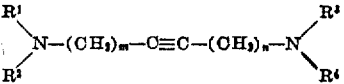

wherein X is a member of the group consisting of chlorine, bromine and iodine, Y is an alkali metal, and $m$ and $n$ are integers, but not zero, having a sum of at least 3 but not greater than 8; $R^1$, $R^2$, $R^3$ and $R^4$ represent members of the group consisting of the same and different lower alkyl, phenyl, phenyl-lower alkyl, and groups wherein $R^1$ and $R^2$, and $R^3$ and $R^4$, are joined so that the nitrogen is part of a monocyclic heterocyclic group of the group consisting of piperidino, pyrrolidino and morpholino groups.

18. The process which comprises reacting a 3-di-lower alkyl amino-1-halopropane with a reactive metal salt of 3-di-lower alkyl amino-1-propyne to produce 1,6-bis(N-di-lower alkyl amino)-2-hexyne.

19. The process which comprises reacting a 3-(N-pyrrolidinyl)-1-halopropane with a reactive metal salt of 3-(N-pyrrolidinyl)-1-propyne to produce 1,6-bis(N-pyrrolidinyl)-2-hexyne.

20. The process which comprises reacting a 3-(N-morpholinyl)-1-halopropane with a reactive metal salt of 3-(N-morpholinyl)-1-propyne to produce 1,6-bis(N-morpholinyl)-2-hexyne.

References Cited in the file of this patent
UNITED STATES PATENTS

| 2,665,311 | McKeever | Jan. 5, 1954 |

FOREIGN PATENTS

| 724,759 | Germany | July 29, 1937 |
| 595,540 | Great Britain | Dec. 8, 1947 |
| 70,257 | Norway | Apr. 15, 1946 |

OTHER REFERENCES

Rose, et al.; Journal of the Chemical Society (London) for 1949, pages 782–785.

U. S. DEPARTMENT OF COMMERCE
PATENT OFFICE

CERTIFICATE OF CORRECTION

Patent No. 2,830,048     John H. Biel     April 8, 1958

It is hereby certified that error appears in the printed specification of the above numbered patent requiring correction and that the said Letters Patent should read as corrected below.

Column 2, lines 64 and 65, for "1-(N-methyl-amino)-" read -- 1-(N-methyl-ethylamino)- --; column 6, line 59, for "1,6-bis(6-dimethylamino)-" read -- 1,6-bis(N-dimethylamino)- --; column 7, line 39, for "to product a compound" read -- to produce a compound --.

Signed and sealed this 1st day of July 1958.

(SEAL)
Attest:

KARL H. AXLINE
Attesting Officer

ROBERT C. WATSON
Commissioner of Patents